United States Patent [19]
Cejka et al.

[11] Patent Number: 6,106,922
[45] Date of Patent: Aug. 22, 2000

[54] COEXTRUDED MECHANICAL FASTENER CONSTRUCTIONS

[75] Inventors: John E. Cejka, Hudson, Wis.; Mark R. Dupre, St. Paul; Jeffrey O. Emslander, Afton, both of Minn.; William H. Hartt, Mason, Ohio; Robert D. Kampfer, Oakdale, Minn.; Francis V. Loncar, Jr., Hudson, Wis.; Louis S. Moren, Mahtomedi, Minn.; Diane L. Regnier, Stillwater, Minn.; Jayshree Seth, Woodbury, Minn.; Robert W. G. Shipman, Oakdale, Minn.; Alan J. Sipinen, North Oaks, Minn.; William C. Unruh, Inver Grove Heights, Minn.; Dennis G. Welygan; Leigh E. Wood, both of Woodbury, Minn.

[73] Assignee: 3M Innovative Company, St. Paul, Minn.

[21] Appl. No.: 08/943,482

[22] Filed: Oct. 3, 1997

[51] Int. Cl.⁷ .................. C08J 5/00; C08J 5/18; C08J 7/00; C08J 7/04

[52] U.S. Cl. .................. 428/120; 428/167; 428/172

[58] Field of Search .................. 428/99, 100, 104, 428/120, 343, 213, 212; 264/1.3, 145; 430/126; 24/452

[56] References Cited

U.S. PATENT DOCUMENTS

| 3,590,109 | 6/1997 | Doleman et al. | 264/167 |
|---|---|---|---|
| 4,056,593 | 11/1977 | Albareda | 264/145 |
| 4,451,421 | 5/1984 | Jones et al. | 264/167 |
| 4,617,214 | 10/1986 | Billarant | 428/40 |
| 4,775,310 | 10/1988 | Fischer | 425/308 |
| 4,794,028 | 12/1988 | Fischer | 428/100 |
| 4,808,474 | 2/1989 | Sipinen | 428/343 |
| 4,872,243 | 10/1989 | Fischer | 247/442 |

(List continued on next page.)

FOREIGN PATENT DOCUMENTS

| 0 575 828 | 12/1993 | European Pat. Off. . |
|---|---|---|
| 0 580 073 | 1/1994 | European Pat. Off. . |
| 0 661 007 | 7/1995 | European Pat. Off. . |
| 0 537 333 B1 | 9/1995 | European Pat. Off. . |
| 1-2388058 | 9/1989 | Japan . |
| 6-2936067 | 10/1994 | Japan . |
| 8-214917 | 8/1996 | Japan . |
| 2 305 388 | 4/1997 | United Kingdom . |
| 2 315 095 | 1/1998 | United Kingdom . |
| WO 93/20976 | 10/1993 | WIPO . |
| WO 94/23609 | 10/1994 | WIPO . |
| WO 94/23610 | 10/1994 | WIPO . |
| WO 95/01863 | 1/1995 | WIPO . |
| WO 95 10202 | 4/1995 | WIPO . |
| WO 95/19242 | 7/1995 | WIPO . |

OTHER PUBLICATIONS

Velcro Companies Home Page; www.velcro.com/velcro.htm; Product Information; Elastic Loop Tapes XP002091024.

*Primary Examiner*—Mark L. Bell
*Assistant Examiner*—Michael J. DiVerdi
*Attorney, Agent, or Firm*—Charles D. Levine

[57] ABSTRACT

A web of material has a plurality of stems extending from at least one side of the web. The web includes a first layer of material having a first side and a second side and a second layer of material. The second layer of material has a first side which faces the first side of the first layer and a second side from which the plurality of stems extend. The first and second layers of material are joined together while they are both molten, before either layer has cooled. The first and second layers of material can be formed of thermoplastic material or melt processable polymeric material. A method of making a web of material includes selecting a first material for a first layer of material and selecting a second material for a second layer of material. The first and second layers of material are melt formed. Then, the first and second layers of material are joined while the layers are in the molten state to form a multiple layer sheet. Next, a plurality of stems are formed on at least the second layer of material. Melt forming can include simultaneously melt forming the first and second layers of material such as by coextrusion.

18 Claims, 2 Drawing Sheets

U.S. PATENT DOCUMENTS

| | | | |
|---|---|---|---|
| 4,894,060 | 1/1990 | Nestegard | 604/391 |
| 4,908,278 | 3/1990 | Bland et al. | 428/500 |
| 4,959,265 | 9/1990 | Wood et al. | 428/343 |
| 5,011,642 | 4/1991 | Welygan et al. | 264/167 |
| 5,077,870 | 1/1992 | Melbye et al. | 24/452 |
| 5,230,851 | 7/1993 | Thomas | 264/145 |
| 5,250,015 | 11/1993 | Kennedy et al. | 264/167 |
| 5,308,695 | 5/1994 | Arakawa et al. | 428/354 |
| 5,315,740 | 5/1994 | Povost | 24/452 |
| 5,316,703 | 5/1994 | Schrenk | 264/1.3 |
| 5,325,569 | 7/1994 | Goulait et al. | 24/448 |
| 5,374,262 | 5/1994 | Keuhn, Jr. et al. | 604/391 |
| 5,393,475 | 2/1995 | Murasaki et al. | 264/167 |
| 5,427,842 | 6/1995 | Bland et al. | 428/213 |
| 5,505,747 | 4/1996 | Chesley et al. | 51/297 |
| 5,540,970 | 7/1996 | Banfield et al. | 428/100 |
| 5,551,961 | 9/1996 | Engen et al. | 51/298 |
| 5,611,122 | 3/1997 | Torigoe et al. | 247/442 |
| 5,624,427 | 4/1997 | Bergman et al. | 604/391 |
| 5,721,086 | 2/1998 | Emslander et al. | 430/126 |
| 5,725,928 | 3/1998 | Kenney et al. | 428/100 |

COEXTRUDED MECHANICAL FASTENER CONSTRUCTIONS

TECHNICAL FIELD

This invention relates to stemmed web constructions. More particularly, the invention relates to stemmed web constructions formed from at least two polymeric materials.

BACKGROUND OF THE INVENTION

Hook and loop fasteners, such as those currently marketed under the trademark Scotchmate™ by 3M, are a common mechanical fastener. One common form of hook is a mushroom-shaped hook which can also be used as a hermaphroditic mechanical fastener by engaging other hooks rather than loops. These hook structures, formed on webs to create a fastener, are one common type of stemmed web. A stem means a protrusion from a surface, such as a web, regardless of its shape, length, length-to-width ratio, geometry or other characteristics.

U.S. Pat. Nos. 4,056,593 and 4,959,265 disclose an early method of extruding polymeric webs with upstanding stems, known as stemmed webs. The stemmed web is formed of a single material. In the hook structure of U.S. Pat. No. 5,077,870, a single component thermoplastic resin is extruded into a tool which has an array of cavities which, upon separation, form an array of stems. The stems are then calendered to produce a broader head at the top of the stem. The shape, dimensions, and angularity of the flanges of the head and the number of stems per area determine the ease of capture and tenacity of hold of the loop onto the hook. The hook and stem material determines the flexibility of the, hook, the rigidity of the stem, and the friction of the hook to the loop. Some resins used in the hook structure are high modulus thermoplastics which provide suitable strength for supporting the hook structure but do not provide adequate flexural strength to prevent the hooks from fracturing or breaking during release of the loop. Also, the hook does not provide low friction for the movement of the loop from the top to the underside of the hook.

U.S. Pat. No. 5,393,475 discloses a method of making a stemmed web with stems on both sides using two different materials. This patent discloses extruding two different materials to form two base portions and forming hooks by allowing the material to fill cavities on two rollers between which the material passes. After, this, the base portions are pressed between the two rollers to laminate or stick them together. In one embodiment a third layer with a chemical affinity for the first two layers is used. This process would necessarily cool the two streams before lamination.

Hooks also can be made using profile extrusion, forming a long rib on the web. The rib is then laterally sliced and then bent or stretched to form a plurality of stems. Heads can be formed on the stems either before or after slicing.

There is a need for stemmed webs, such as mechanical fasteners, having a wider variety of properties to meet more varied applications.

SUMMARY OF THE INVENTION

The present invention is a web of material having a plurality of stems extending from at least one side of the web. The web includes a first layer of material having a first side and a second side and a second layer of material. The second layer of material has a first side which faces the first side of the first layer and a second side from which the plurality of stems extend. The first and second layers of material are joined together while they are both molten, before either layer has cooled.

The first and second layers of material can be formed of thermoplastic material or melt processable polymeric material. The first layer of material differs from the second layer of material and in one embodiment the material forming the first layer protrudes into and forms at least part of the stems formed on the second layer.

In another embodiment, one of the layers is discontinuous and includes a plurality of portions of the respective material unconnected with other portions of the same respective material. The portions have shapes selected from the group of rods, prisms, spheres, parallelepipeds, irregular angular shapes, and irregular curved shapes.

In other alternative embodiments, both surfaces of the web can have stems, and one or more of these stems can have caps. Also, at least one surface of the web can be receptive to a colorant for the formation of a durable image for use in printed matter and graphics applications or can have frictional or release characteristics. Also, additional layers of material can be formed and joined together with the first and second layers while they are all molten, before any layer has cooled.

The invention is also a method of making a web of material having a plurality of stems. The method includes selecting a first material for a first layer of material and selecting a second material for a second layer of material. The first and second layers of material are melt formed. Then, the first and second layers of material are joined while the layers are in the molten state to form a multiple layer sheet. Next, a plurality of stems are formed on at least the second layer of material.

The stems can be formed by pressing the multiple layer sheet against at least one temperature controlled surface containing an array of holes to form an array of stems. Caps can be formed on the tips of the stems by pressing the stems against a heated surface to form caps on the tips of the stems.

Alternatively, the stems can be formed by extruding multiple layers of a thermoplastic or melt processable material through a shaped die to form a multiple layer sheet having a plurality of raised ribs on at least one surface. A plurality of sharp edges is passed perpendicularly through the ribs, and the multiple layer sheet is stretched to separate each rib into a plurality of stems. The stems can be formed with a hooked shape or subsequently pressed against a heated surface to form a hook or capped stem.

The melt forming step can include simultaneously melt forming the first and second layers of material. The joining step, can include joining together the first and second layers before any layer has cooled. Melt forming can be accomplished by coextruding the first and second layers of material.

BREIF DESCRIPTION OF THE DRAWINGS

DETAILED DESCRIPTION

Figure 1:
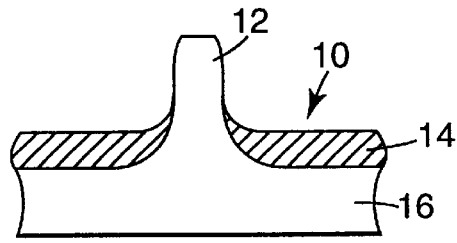
FIG. 1 is a cross-sectional view of a stemmed web where the stems are formed of a continuous lower layer of material, and a portion of the stems and the web surface between stems are covered by the upper layer of material.

Mechanical fastener hook structures are one type of stemmed web. These mechanical fasteners have some type of hook formed on a stem which, in turn, is formed on a web. In some applications, the hook structures and base supports are made from multiple components. In the present invention, these multiple components are formed together, such as by melt forming (such as extrusion) to enhance the performance properties of the mechanical fastener. These, performance enhancements depend on the selection of materials and include: hook strength, hook and stem flexibility, durability, wear resistance, loop retention, loop engagement, softness, appearance, peel, and shear strength. Selecting materials and configurations tailors the mechanical fastener properties for individual applications.

Another type of stemmed web has uncapped stem structures. The stem surface can be self mating when the surface of the stems is autoadhering.

Some properties that affect the performance enhancements include the thickness of the layers of material, the stem construction (whether the stems are formed of one or more materials and the relative placement of the materials if the stem is composed of more than one material), the layer geometry (continuous, discontinuous, or multiple layers), the stem density, the stem geometry (whether the stems are essentially straight or angled or have shaped hooks) and the characteristics of the second surface of the construction.

The multiple layer fastener includes at least two thermoplastic (or melt processable polymeric) layers that are formed, joined while the layers are in a molten state and cooled, with at least one surface having an array of stems. The materials can each have some different properties. For example one may be ductile while the other may be stiff. Some examples of material types are polyolefins such as polypropylene or polyethylene; other thermoplastics such as polystyrene, polycarbonate, polymethyl methacrylate, ethylene vinyl acetate copolymers, acrylate modified ethylene vinyl acetate polymers, and ethylene acrylic acid copolymers; elastomers such as natural or synthetic rubber, styrene block copolymers containing isoprene, butadiene, or ethylene(butylene) blocks, metallocene-catalyzed polyolefins, polyurethanes or polydiorganosiloxanes; pressure-sensitive adhesives such as acrylic, natural or synthetic rubber, tackified styrene block copolymers, tackified polydiorganosiloxane urea copolymer and amorphous poly (1-alkene); hot melt adhesives such as ethylene-vinylacetate; ductile thermoplastics such as nylon or polyvinylchloride; non-tacky adhesives; or blends. Multiple layers, such as more than three and typically as many as one hundred layers, can also result in new compositions of stem-surfaced web constructions having properties that may be different from those of the individual materials used.

The materials can also be used to provide desired characteristics on either or both sides of the web. Some examples of these include adhesive surfaces, surfaces that can provide an abrasive or high friction surface, release surfaces that can provide a low friction surface, and active surfaces that provide a receptive surface for materials such as adhesives, coatings, or colorants to produce a durable image. Colorants can encompass a broad range of materials such as inks in water, or inks in organic solvents, or inks that are composed of 100% active material. These inks can be cured by such methods as exposure to UV light or electrostatic graphic imaging. Coatings can include any number of materials either as a 100% solids material, or dissolved or dispersed in any combination of water and organic solvents. One example would be a coating that permits the material to be printed by an inkjet printer.

Relative layer thicknesses influence the part that a particular material may play. A thin layer of adhesive forming the outer layer of a stem and a stiff polymer forming a thick core of a stem results in a stem array that is more rigid, than that having a thick layer of adhesive over a thin stiff core.

By controlling the thickness, viscosity, and processing conditions, numerous different constructions can be made of a base and stem. These constructions, along with the material selection, determine the performance of the final mechanical fastener hook. FIG. 1 shows a first construction of a sheet or web 10 having stems 12. This construction uses two layers of coextruded material, an upper layer 14 and a lower layer 16. In this construction, more. lower layer material is used. The lower layer 16 forms the base of the sheet, and the core and the upper portion of the stems 12. The upper layer 14 forms a surface layer on the base of the sheet and around the lower portion of the stems. As shown in FIG. 1, as well as many of the other embodiments, a single material is used to form the upper and lower layers 14, 16. In alternative embodiments, a plurality of materials and a plurality of sublayers can form the respective upper and lower layers 14, 16.

Figure 2:
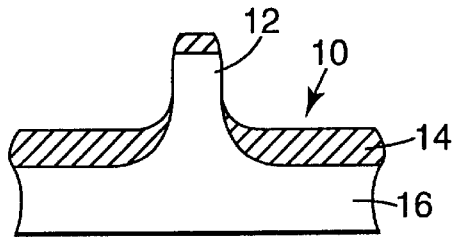
FIG. 2 is a cross-sectional view of a stemmed web where the top of the stems, a portion of the stems, and the web surface between stems are covered by a discontinuous upper layer of material, and most of the stem is formed of a continuous lower layer of material.

FIG. 2 shows a construction with more material in the upper layer 14 than in the construction of FIG. 1. The lower layer 16 again forms the base of the sheet 10 and the core of the stems 12. Here, the upper layer 14 forms a crown on a stem made from the lower layer 16. The upper layer 14 also forms- a surface layer on the base of the sheet, including a sheath of material surrounding the base of the stem.

Figure 3:
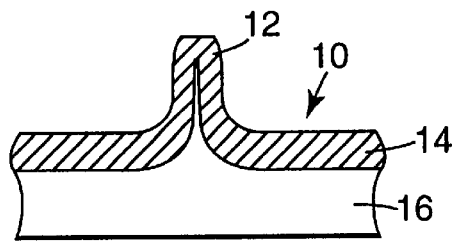
FIG. 3 is a cross-sectional view of a stemmed web where the web has stems and a web surface between the stems covered by a continuous upper layer of material, and the stems have a core predominantly of a lower layer of material.
Figure 4:
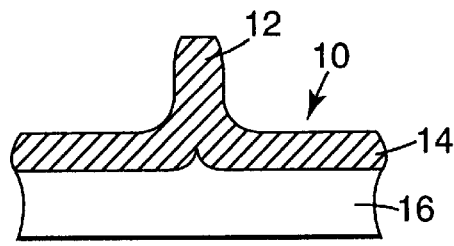
FIG. 4 is a cross-sectional view of a stemmed web where the web has stems and a web surface between the stems covered by a continuous upper layer of material, and the stems have a core minimally of a lower layer of material.
Figure 5:
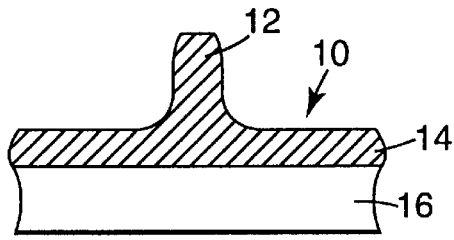
FIG. 5 is a cross-sectional view of a stemmed web where the web has stems and a web surface between the stems formed by a continuous upper layer of material.

In FIG. 3, the lower layer 16 forms the base of the sheet 10 and a column of core material for the stems 12. The upper layer 14 forms the surface layer on the base and on the stems. In FIG. 4, the lower layer 16 again forms the base of the sheet 10 and a small portion of the stems 12. The upper layer 14 forms the surface layer on the base and forms the majority of the stem material. The lower layer can form any portion of the stems to the point where the upper layer forms the base sheet and the stems, and the lower layer is a continuous smooth sheet that does not form. any part of the stems. FIG. 5 shows an embodiment similar to FIG. 4. In FIG. 5, the lower layer 16 forms the base of the sheet 10 and the upper layer 14 forms the surface layer on the base and forms the entirety of the stem material.

Figure 6:
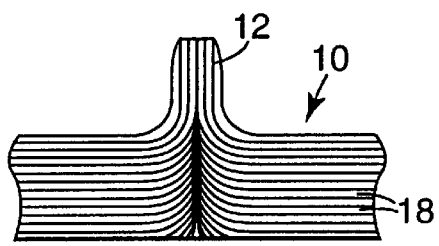
FIG. 6 is a cross-sectional view of a stemmed web where the stem is formed of many multiple substantially continuous layers of material.

FIG. 6 shows a stemmed sheet construction using many layers 18 of material. These many layers could be as few as two layers or scores of different layers. The layers can be two or more different materials that can optionally be repeated in different layers. The base of the sheet and the stems both are formed of many layers of material. This construction can result in an end product with only one material (the uppermost layer) forming the surface layer on the base and forming the outer surface of the stems. Alternatively, as shown, the stems can have many layers exposed along the length of the stem from the bottom of the stem to the top.

The layers of the stemmed sheet, before stem formation, can be formed simultaneously or serially, as long as they are joined together while they are both molten, before either layer has cooled. Thus, the layers are not laminated to each other and are cooled simultaneously. After the stems are formed on one side of the web no further material is added to the other side of the web to complete the web. Optionally, other material, like adhesives and printing can be applied to the web depending on the intended use and application for the web.

Coextrusion can occur by passing different melt streams from different extruders into a multiple manifold die or a multiple layer teed block and a film die. In the feed block technique, at least two different materials are fed from different extruders into different slots (usually 2 to over 200) in a feed block. The individual streams are merged in the feed block and enter a die as a layered stack that flows out into layered sheets as the material leaves the die. The layered sheet leaving the die is passed between a nip formed by two rolls. At least one of which has a tooled surfaced to create stems. Alternatively, the stems can be formed by passing the web through a patterned die lip to form a web having downweb ridges, slicing the ridges and stretching the web to separate the stems. The multiple manifold die combines the different molten streams from different extruders at the die lip. The layers are then handled as above to form stems. This method is usually limited to 2–3 layered films because of the increased complexity as the number of layers is increased.

Serial forming can be accomplished by, for example, sequential extrusion, first extruding one layer and then extruding another layer. This can be performed with one or more dies. Alternatively, the layers can be formed in molds or by other known methods. Simultaneous forming can be accomplished by, for example, coextrusion. A single multiple manifold die can be used or a feedblock which splits into multiple cavities to create multiple layers can be used. Alternatively, the layers can be formed in molds or by other known methods.

The stem density depends on the application for the product. Densities ranging from 12–465 stem/cm$^2$ (81–3000 stems/in$^2$) are most useful. Many different stem geometries can be used. Stems can be straight, angled, or headed. Headed stems can be shaped like mushrooms, golf tees, or nail heads. They can have an extruded profile. Straight stems can be self mating, can have a pressure-sensitive adhesive (PSA) outer layer, or can be subsequently coated with a PSA.

The stemmed web can also have a smooth surface with a coextruded layer on the smooth side of the web (the side opposite the stems) that combines the mechanical fastening function of the stemmed surface with another function.

Figure 7:
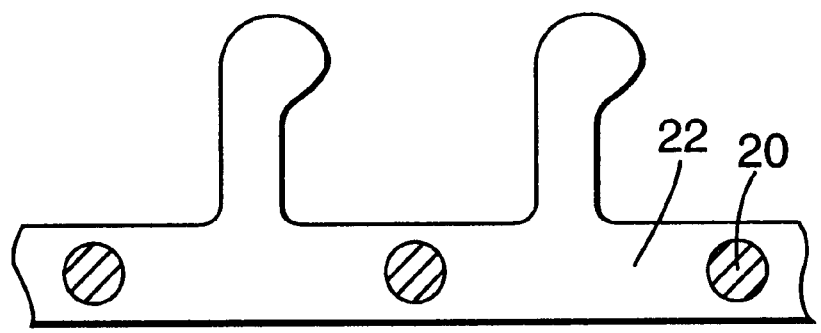
FIG. 7 is a cross-sectional view of a stemmed web where the stem is formed entirely of a continuous outer layer of material and the base region contains discontinuous regions of elastic material.

As shown in FIG. 7, the stemmed web 10 can be formed of a discontinuous layer 20, which can include a plurality of portions of material unconnected with other portions of the same material, and a continuous layer 22. The portions, can have any shapes including, for example, rods, prisms, spheres, parallelepipeds, irregular angular shapes, and irregular curved shapes., In one embodiment, the discontinuous portions can be formed of an elastic material. They can be elastic continuous regions encased in continuous outer layers to provide local stretchable regions. In this embodiment, the melt viscosity of the continuous non-elastic material preferably is higher than that of the discontinuous elastic material to enhance the downweb drawing of the elastic domains.

Figure 8:
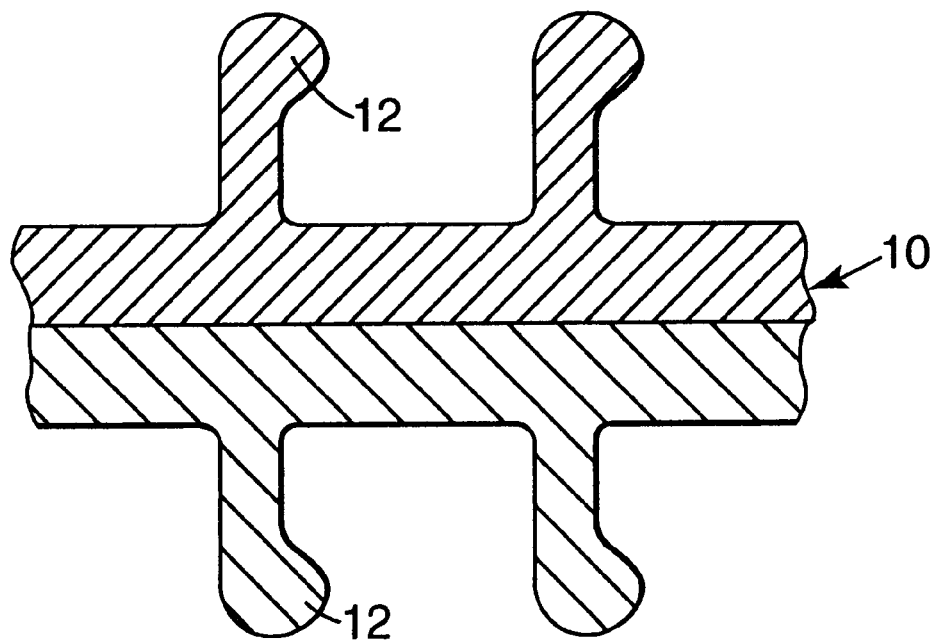
FIG. 8 is a cross-sectional view of a web having stem surfaces on both sides where the stem of one side is composed of a different material than the stem of the other side.

In one embodiment, shown in FIG. 8, a plurality of stems 12, with or without heads, can be formed on both sides of the web 10. These webs can be used, for example, as wrap-around pull roll covers or for other areas where controlled friction is desired.

In addition, various additives may be used, such as physical or chemical blowing agents (to preferentially foam or expand a section of or all of one or more layers) or fillers (to alter material firmness and flow properties). One use of foaming agents is to form a cap upon foaming by placing the foaming agent in the material that is in the tip of the stem. Microspheres, flame retardants, internal release agents, colorants, thermally conductive particles, and electrically conductive particles also can be used.

Hooks also can be made by capping the stems to form mushroom heads as disclosed in U.S. Pat. No. 5,077,870. Also, hooks can be made using profile extrusion, forming a long rib on the web. The fib is then laterally sliced and then stretched to form a plurality of stems. Heads can be formed on the stems either before or after slicing. This is disclosed in U.S. Pat. No. 4,894,060.

The stemmed webs of this invention can be used in virtually any application as any other stemmed web.

EXAMPLES

This invention is further illustrated by the following examples which are not intended to limit the scope of the invention. In the examples, all parts, ratios and percentages are by weight unless otherwise indicated. The following test methods were used to characterize the stemmed web compositions in the following examples:

180° Peel Adhesion Test

Stemmed web samples 1.25 cm wide and 15 cm long were tested for 180° peel adhesion to stainless steel and/or smooth cast biaxially oriented polypropylene films. The samples were adhered to the test surfaces by rolling the tapes with a 2.1 kg (4.5 lb) roller using 4 passes. After aging at controlled temperature and humidity conditions (approximately 22° C., 50% relative humidity) for approximately 1 hour, the tapes were tested using a Model 3M90 slip/peel tester, available from Instrumentors, Inc., in 180° geometry at 30.5 cm/min (12 in/min) peel rate, unless otherwise noted. Results are reported in N/dm.

Tear Strength Test

One end of a specimen, approximately 75 mm long and exactly 63 mm wide, was positioned in a vertical plane with the long dimension extending horizontally with the ends of the specimen gripped between a pair of fixed clamps horizontally spaced 2.5 mm from a pair of movable clamps that grip the other end of the specimen. A 20 mm slit was made in the lower edge of the specimen between the two pairs of clamps. A pendulum, carrying a circumferentially graduated scale, was then allowed to fall freely, tearing the pre-cut specimen along a continuation of the slit. A frictionally mounted pointer on the scale indicated the resistance of the specimen to tearing in grams. This test is commonly referred to as the Elmendorf Tear Strength Test and values are reported in grams/ply.

Load At Yield Test (ASTM D-882-81)

A 25.4 mm (1.0 in) wide by approximately 150 mm strip of film was mounted in a tensile testing machine, an Instron™ Tensile Tester, with the upper and lower jaws 25.4 mm apart. The jaws were then separated at the rate of 254 mm/min (10 in/min) until the yield point is reached. The downweb direction of the films was tested after the films were equilibrated at 70–72° C. and 50% RH for about 2 weeks. Load at yield was reported in lb/in width.

Impact Strength Test

Impact strength was tested. Two types of tests were run: (a) full sheet and (b) 2.5 cm (1 in) crease. In the full sheet test, several sheets, each measuring 10.2 cm×15.2 cm (4 in×6 in), were cut from a larger sheet that had been conditioned for 24 hours at approximately 23° C. and 50% RH and then placed in a sample holder. The sample holder was then placed in a Model 13-13 TMI Dynamic Ball Tester having a pointer set at "p." A pendulum, with a predetermined weight, was released and impacted the sample. The pointer position was recorded in units of cm-kg. In the 2.5 cm (1 in) crease test, several sheets, each measuring 2.5 cm×15.2 cm (1 in×6 in), were cut from a larger sheet that had been conditioned for 24 hours at approximately 23° C. and 50% RH. The ends were held to form a loop and part of the loop was placed into a Model No. 12AS Sentinel Heat Sealer from Packaging Industries, Inc. that had been set to 0.62 MPa (90 psi) for 0.2 sec with the heat off. The resulting strip was placed, having a crease across its 2.5 cm width about half way down the length of the strip, into the middle of the holder and held in place with 12.3 mm wide adhesive tape. The sample holder was then placed in a Model 13-13 TMI Dynamic Ball Tester, the sample was tested and the impact against the crease was noted. The results are reported as described above for the full width test.

Tape Snap Test

Ink adhesion was evaluated using the Tape Snap Test (ASTM #3359). The Tape Snap Test consists of scoring an ink layer with the corner of a single edge razor blade without damaging the underlying print surface, making lines approximately 1 cm apart in a cross-hatched pattern. A piece of Scotch™ 610 tape (3M) approximately 10 cm long was applied to the cross-hatched area using a PA1 applicator. (3M), bonding approximately 8 cm of the tape to the ink, leaving one end free to be grabbed by the tester. The tape was held by one hand of the tester while the other hand kept the graphic stationary. The tape was peeled back at approximately 180° as rapidly as possible by the tester. An excellent result was when no ink was removed by the tape; a good result was when small (5% or less) was removed; a poor result was when significant portions of the ink were removed (5%–25%); a failure was when nearly all the ink was removed.

EXAMPLES 1–5

The stem-surfaced films of Examples 1–5 all had a PSA layer on the stem surface side of the film and were self-mating fasteners.

In Example 1, Component A (upper layer 14), HL-2542-X (a rubber based PSA in pellet form available from H. B. Fuller), was fed into a single screw extruder having a diameter of about 25 mm (1.0 in), an L/D of 24/1, a screw speed of 15.7 rpm and a rising profile up to approximately 182° C. Component A was passed through the extruder and continuously discharged at a pressure of at least about 0.69 MPa (100 psi) through a heated neck tube and into one port in a three-layer adjustable vane feed block (Cloeren™ Model 86-120-398, available from Cloeren Co. and setup for two layers) that was mounted on a 25.4 cm (10 in) wide film die (Ultraflex™ 40 die, Model 8811741, available from Extrusion Dies, Inc.). Component B (lower layer 16), Shell SRD 7-560 (an ethylene-polypropylene impact copolymer now available from Union Carbide), was fed into a second single screw extruder having a diameter of about 32 mm (1.25 in), an L/D of 24/1, a screw speed of 30 rpm and a temperature profile that steadily increased to approximately 204° C. Component B was then continuously discharged at a pressure of at least about 0.69 MPa (100 psi) through a heated neck tube and into a second port in the three-layer feed block. The feed block and die were set at approximately 193° C. The die gap was 0.5 to 0.8 mm (20 to 30 mils). The two layer molten construction, a top layer, Component A, and a base layer, Component B, was discharged from the die and drop fed into a nip formed by two rolls having a nip pressure of 0.62 Kpa (90 psi). The first roll presented a tooled surface that was heated to 59° C. and contained cavities with diameters of about 280 microns (11 mils), depths in excess of about 2.5 mm (100 mils) and spacing of about 813 microns (32 mils), resulting in a stem array having a stem density of about 140 stems/cm$^2$ (900 stems/in$^2$). The second roll had a chrome-plated surface that was also heated to 59° C. The top side of the two layer molten construction faced the tooled surface and the base side faced the chrome surface. The resulting cast film was removed from the tooled surface at a rate of about 1.5 n/min (5 fpm) to form a stem-surfaced film with rod-like stem projections extending from the surface on the film with a diameter of approximately 300 microns and a height of 587 microns. These stem structures, resembling FIG. 3, were fully covered with the adhesive layer and had a core of Component B.

In Examples 2–5, the stem-surfaced film was made in a manner similar to that of Example 1 except a tooled surface having a different hole density, a different extruder for Component A, and different process conditions were used. The tooled surface had a cavity density that resulted in stem-surfaced films having about 390 stems/cm$^2$ (2500 stems/in$^2$). Component A was fed into a single screw extruder having a diameter of about 32 mm (1.25 in), an L/D of 30/1. The screw speeds for the extruders moving Component A and Component B were in a ratio of 12.0/30.0, 7.0/9.3, 7.0/9.3 and 10.0/9.25 for Examples 2–5, respectively, and the maximum temperatures of the extruders feeding Components A and B were 185° C./204° C., 205° C./221° C., 205° C./221° C. and 185° C./204° C. for Examples 2–5, respectively. The web speeds were 2.1 m/min (7 fpm), 2.1 m/min (7 fpm), 3.0 m/min (10 fpm) and 2.1 m/min (7 fpm) for Examples 2–5, respectively. The nip rolls for each example had a pressure of 0.62 Na (90 psi) and the surfaces of each roll was heated to 65° C., 60° C., 60° C. and 48° C. for Examples 2–5, respectively.

The stem-surfaced films of Examples 1–5 were tested for 180° peel adhesion (using the test described above). The results are set forth in Table 1 together with the extruder screw speed ratios for Component A and Component B and the stem density for each example.

TABLE 1

| Example | Speed Ratio A/B | Stem Density stems/cm$^2$ | Peel Adhesion N/dm |
|---|---|---|---|
| 1 | 15.7/30.0 | 140 | 10 |
| 2 | 12.0/30.0 | 390 | 16 |
| 3 | 7.0/9.3 | 390 | 81 |
| 4 | 7.0/9.3 | 390 | 97 |
| 5 | 10.0/9.25 | 390 | 186 |

The coextruded stem-surfaced films were self-mating and did not require a capped tip and a looped counterpart to mechanically fasten together. Adhesion was influenced by Component A thickness as determined by relative screw speeds. used for Component A and Component B, film web speed, and stem-array density. At a low stem-array density the PSA (Component A) on the tips of the stems and base between the stems were the primary engagement surfaces because the distance between the stems is much greater than the diameter of the stems. At a high stem-array density, the sides of the stems and valleys between the stems were the primary engagement surfaces because the PSA coats both the sides of the stems and the base between the stems. When the stem-array density was sufficient to result in a high frequency of side engagement of the stems, the thickness of the adhesive layer had a more significant effect.

EXAMPLES 6–12 AND COMPARATIVE EXAMPLE 1

The stem-surfaced films of Examples 6–12 were composed of various combinations of at least two different polymers including thermoplastics, thermoplastic elastomers and elastomers. Component A acts as a skin layer and Component B acts as a core layer.

In each example, 0.5 to 1.0 wt. percent of a blue pigment was added to one component and 0.5 to 1.0 wt. percent of a red pigment was added to the other component to permit visual determination of the configuration of the stems and subsequent heads and shafts of the shaped stems.

The stem-surfaced film of Example 6 was made in a manner similar to that of Example 1 except different materials and process conditions were used. Component A was PP7644 (a polypropylene polymer, melt flow 23 g/ 10 sec, available from Amoco) and Component B was PP5A95 (a polypropylene polymer, melt flow 9.5 g/10 sec). Component A was passed at 102 rpm through a single screw extruder (32 mm (1.25 in), 24/1 LID) that was heated to approximately 246° C. Component B was passed at 60 rpm through a single screw extruder (19 mm (0.75 in), 38/1 L/D) that was heated to approximately 216° C. The feedblock was heated to approximately 246° C. The stem-surfaced film traveled at a speed of 1.5 m/min (5 fpm). The surface of the roll having the tooled surface was heated to approximately 50° C. and the roll having the chrome-plated surface was heated to approximately 50° C. Upon visual examination, the stems on the surface resembled the stem depicted in FIG. 3. The stems combined the softer feel of softer thermoplastic Component A with the more rigid core support of harder thermoplastic Component B.

In Example 7, the stem-surfaced film was made in a manner similar to that of Example 6 except Component A was PP5A95 and was passed at 45 rpm through a 19 mm (0.75 in) Killion™ single screw extruder with an LID of 32/1 that was heated to approximately 216° C. Component B was ENGAGE™ EG8200 (an ethylene/poly-α-olefin copolymer available from Dow Plastics Co.) and was passed at 75 rpm through a 32 mm (1.25 in) Killion™ single screw extruder with an L/D of 24/1 that was heated to approximately 232° C. The stem-surfaced film traveled at a speed of 2.4 m/min (8 fpm). The roll with the tooled surface and the roll with the chrome-plated surface were heated to approximately 70° C. Upon visual examination, the stems on the surface resembled the stem depicted in FIG. 1. The stem tips had the higher friction of elastic Component B combined the more rigid support of the cylinder formation of the stiffer thermoplastic Component A.

In Example 8, the stem-surfaced film was made in a manner similar to that of Example 7 except Component A was Engage™ EG8200 and was passed at 50 rpm through the extruder and Component B was PP5A95 and was passed at 70 rpm through the extruder. The stem-surfaced film traveled at a speed of 2.1 m/min (7 fpm). The roll with the tooled surface and the roll with the chrome-plated surface were cooled to approximately 7° C. Upon visual examination, the stems on the surface resembled the stem depicted in FIG. 1. The stem tips had the lower friction of the stiffer thermoplastic Component A combined the more flexible support of the cylinder formation of the elastomeric Component B.

In Example 9, the stem-surfaced film was made in a manner similar to that of Example 7 except Component A was Engage™ EG8200 and was passed at 60 rpm through the extruder and Component B was Styron™ 666D (a polystyrene, available from Dow Chemical Co.) and was passed at 60 rpm through the extruder. The stem-surfaced film traveled at a speed of 2.1 m/min (7 fpm). The roll with the tooled surface and the roll with the chrome-plated surface were heated to approximately 7° C. Upon visual examination, the stems on the surface resembled the stem depicted in FIG. 3. The stems combined the smooth feel of elastomeric Component A with the rigid core support of a hard thermoplastic Component B.

In Example 10, the stem-surfaced film was made in a manner similar to that of Example 7 except Component A was passed at 60 rpm through the extruder and Component B was a preblended mixture of 20 wt percent Styron™ 666D and 80 wt percent PP5A95, and was passed at 50 rpm through the extruder. The stem-surfaced film traveled at a speed of 3.0 mn/min (10 fpm). The roll with the tooled surface and the roll with the chrome-plated surface were heated to approximately 50° C. Upon visual examination, the stems on the surface resembled the stem depicted in FIG. 3. The stems combined the softer feel of less rigid thermoplastic Component A with the reinforcement supplied by a core having elongated discontinuous regions of a more rigid thermoplastic in a continuous region of the same material as the skin.

In Example 11, the stem-surfaced film was made in a manner similar to that of Example 7 except Component A was No. 1057 (a polypropylene homopolymer, melt flow index of 11 g/10 sec, available from Union Carbide) and was passed at 15 rpm through a 38 mm (1.5 in) Davis Standard Model DS15S single screw extruder having an L/D of 24:1 and a temperature profile rising from approximately 190° C. to 232° C. Component B was a preblended mixture of Carbide™ 5A97 (a polypropylene homopolymer, melt flow index of 5 g/10 sec, available from Union Carbide) and Vectorm 4111 (a styrene isoprene block copolymer, available from Dexco Polymers). The mixture was made in a weight ratio of 40:60 and was passed at 15 rpm through a 64 mm (2.5 in) Davis Standard Model 25IN25 single screw extruder having an L/D of 24:1 and a temperature profile rising from approximately 204° C. to 232° C. The 3-layer Cloeren™ feedblock was a Model J.O. 90-802 and the die was a 63 5 mm (25 in) Cloeren™ Epoch Extrusion J.O. 90-802. The relative feed rates of Component A and Component B resulted in a film having an ABA construction where the ratio by weight of ABA was 10:80:10. The stem-surfaced film traveled at a speed of 12.2 n/min (40 fpm). The roll with the tooled surface and the roll with the chrome-plated surface were heated to approximately 38° C. Upon visual examination, the stems on the surface resembled the stem depicted in FIG. 3. The thermoplastic elastomeric Component B provided an elastic stem core that increased the stems' flexibility and a shell of Component A made the stems suitably rigid. Also, the large excess of Component B provided a more elastic base film that allowed the stem-surfaced film to. be significantly more elastic than one made of only Component A.

In Comparative Example 1, a stem-surfaced film was made from only a single layer of SRD 7-560 having similar thickness and stem-array density as that of Example 11.

In Example 12, the stem-surfaced film was made in a manner similar to that of Example 11 except Component A was Attane™ 4802 (an ultra low density polyethylene available from Dow Chemical Co.) and was passed at 48 rpm through the extruder and Component B was SRD 7-560 and was passed at 122 rpm through the extruder. Component A was directed to the outer two layers of the feedblock and Component B was directed to the middle layer. The relative feed rates of Component A and Component B resulted in a film having an ABA construction where the ratio by weight of ABA was 10:80:10. The stem-surfaced film traveled at a speed of 18.3 m/min (60 fpm). The roll with the tooled surface and the roll with the chrome-plated surface were heated to approximately 71° C. Upon visual examination, the stems on the surface resembled the stem depicted in FIG. 3. The low molecular weight thermoplastic Component B provided a less rigid stem core that caused the stems to feel softer. The shell of Component A made the stems suitably rigid. Also, the large excess of Component B provided a more flexible base film that allowed the stem-surfaced film to be significantly less rigid than Comparative Example 1.

As seen in Examples 6–12, the properties of the heads, the stems and the base films can vary over a wide range depending on both the type of polymer components used as a skin or a core material and the configuration of the polymers in the shafts, the heads of the capped stems, and in the base film. Also, multiple layered stems were observed to fill the tooled surface more completely than homogeneous stems Example 12 vs. Comparative Example 1).

EXAMPLE 13

A three layer stem-surfaced film was made with a discontinuous middle layer. The film was made in a manner similar to that used in Example 12 except different materials and process conditions were used. Component A was SRD 7-560 and was passed at 50.1 and 41.3 rpm through two 64 mm (2.5 in) single screw extruders each having an L/D of 24:1 and a temperature profile rising from approximately 218° C. to 274° C. and into the outer two layers of a 3-layer Cloeren™ Model adjustable vane feedblock. Component B, Kraton™ G1657 (a linear styrene-(ethylene-butylene) block copolymer, available from Shell Chemical Co.), was fed at 45 rpm through a 38 mm (1.5 in) single screw extruders having an L/D of 24:1 and a temperature profile rising from approximately 160° C. to 204° C. and into the middle layer of the feedblock. A steel insert was bolted to the lower vane and the upper vane was moved into contact with the insert to constrict the flow of the Component B into 6 mm (¼ in) wide slots that were machined onto the insert at 83 mm (3 ¼ in) intervals. Component B exited from the insert channels and was encapsulated by the upper and lower layers of Component A just before entering the land area of a 45 7 mm (18 in) Cloeren™ die. The roll with the tooled surface and the roll with the chrome-plated surface were maintained at approximately 26° C. and 6° C., respectively. The stem-surfaced film traveled at a speed of 15.2 m/min (50 fpm) and had a stem height of about 760 microns (30 mils), a stem density of about 140 stems/cm$^2$ (900 stems/in$^2$), and an overall weight of about 170 g/m$^2$. The stem surface film was then passed over a roll heated to about 137° C. to cause the tips of the stems to soften and form mushroom shaped heads or caps. When the film was pulled in the transverse direction the film exhibited elastic stretch properties in the region where the discontinuous Component B was embedded.

EXAMPLES 14, 15 AND COMPARATIVE EXAMPLE 2

The stem-surfaced films of Examples 14 and 15 were composed of two different polymers, Component A and Component B, arranged in alternating layers, i.e., ABA . . . BA, as shown in FIG. 6.

In Example 14, the stem-surfaced film was made in a manner similar to Example 6 except that different materials were used and a different processing conditions were used that included a multilayer arrangement that resulted in a polymeric web having 29 layers. Component A was Carbide™ 7-587 (a propylene copolymer, available from Union Carbide), and was passed at 122 rpm through a 64 mm (2.5 in) Davis Standard Model 25IN25 single screw extruder having an L/D of 24:1 and a temperature profile rising from approximately 204° C. to 232° C. Component B was Exact™ 4041 (an ethylene-butene copolymer polyolefin, available from Exxon) and was passed at 48 rpm through a 38 mm (1.5 in) Davis Standard Model DS 1 5 S single screw extruder having an LID of 24:1 and a temperature profile rising from approximately 190° C. to 232° C. The two molten materials were then supplied to predetermined slot locations in a 70 mm (97.5 in) Extrusion Die Model No. 71, available from Johnson Plastic Machinery. The feedblock contained an insert having a linear array of adjacent slots each having an X (width) dimension of 12.5 mm for all layers (i.e., interior and exterior) of Component A. All other slots had an X dimension of 9.4 mm. Transfer tubes connected each extruder to first and second distribution manifolds which delivered the materials to the predetermined slot locations in the insert. There were 29 slots, 15 for Component A and 14 for Component B. The product exiting the insert had a generally rectangular cross section and had alternating layers of Component A and Component B. After exiting the insert the product was comparatively smoothly compressed along its Y axis (height) while being comparatively smoothly expanded along its X axis (width). The now wide and relatively thin film was passed through the adjustable lips of the die to obtain a flat film. The feed rates were adjusted to yield a film having a ratio by weight of Component A to Component B of 80:20. The film traveled at a speed of 16.5 m/min (54 fpm). The roll having the tooled surface and the toll having the chrome-plated surface were heated to approximately 71° C. and 93° C., respectively.

The stem-surfaced film of Example 15 was made in a manner similar to that of Example 14, except 121 slots were used resulting in a film having 61 alternating layers of Component A and 60 alternating layers of Component B and the film speed was 12.2 m/min (40 fpm).

In Comparative Example 2, a stem-surfaced film was made from only a single layer of Carbide™ 7-587 having similar thickness and stem-array density as that of Example 14.

Each stem-surfaced film was tested for tear resistance, load at yield, and impact strength. The results are shown in the following table.

TABLE 2

| Example | Load at Yield (kg/cm width) | Tear (grams/ply) | Impact Full (cm-kg) | Impact Creased (cm-kg) |
|---------|---|---|---|---|
| CE2 | 1.4 | 22 | 6.6 | 0.3 |
| 14 | 1.3 | 40 | 11.3 | 2.8 |
| 15 | 1.9 | 63 | 11.7 | 3.7 |

As seen in Table 2, the tear resistance and impact strength of the multiple layer stem-surfaced films exceeded that of the Comparative Examples. Under cross-sectional SEM, it was surprisingly observed that the multiple layers remained intact in the stems.

EXAMPLE 16 AND COMPARATIVE EXAMPLE 3

Example 16 demonstrates the applicability of the present invention to prepare a stem-surfaced sheet that readily accepts printing or other indicia. A bicomponent stem-surfaced film was made of polypropylene (Shell "SRD 7-560") and Bynel™ 3101 copolymer (an acrylate-modified ethylene-vinyl acetate copolymer, available from E. I. DuPont de Nemours, Wilmington,, Del.). The polypropylene was extruded at about 55 rpm from a 3 8 mm single-screw extruder (Johnson Company) having an L/D of 30:1 and a temperature profile rising from approximately 150° C. to 205° C. Separately, the copolymer was extruded at about 20 rpm from a 25 mm Killion single-screw extruder (Killion Company, Ann Arbor, Mich.) having an L/D of 30:1 and a temperature profile rising from about 150° C. to about 205° C. The two extrudates were combined in a 203-mm wide split-manifold film die Extrusion Dies, Incorporated, Chippewa Falls, Wis.). The exuding bicomponent film was directed into the nip between the top and middle rolls of a 3-roll stack having provision for cooling and rotating at 2.68 m/min (8.8 ft/min). The top and bottom rolls were made of chrome-plated steel, and the middle roll was covered with rubber, the rubber having a uniform array of 0.508 mm (0.020 in) diameter by 2.03 mm (0.080 in) deep holes in its surface. The array of holes was disposed in equally-spaced, staggered rows parallel to the axis of rotation of the roll. The spacing between holes in each row was 2.79 mm (0.110 in) and the rows were spaced 1.40 mm (0.055 in) apart. Upon exiting the nip between the top and middle rolls, the film was allowed to remain in contact with the middle roll for 180° of traverse (until it entered and exited the nip between the middle and bottom rolls) where it was then transferred to the bottom roll. After being transported in contact with the surface of the bottom roll for about 180° of travel, the resultant stemmed-surface bicomponent film was directed to a winder. The resultant film had stem side of polypropylene and a smooth side consisting of a 25 to 50 mm thick layer of Bynel copolymer.

In comparative Example 3, a stem-surfaced film, made of Shell polypropylene SRD7-560 having stem dimensions and a stem array density similar to Comparative Example 2 (except the film speed was 12.2 mni/min (40 fpm)) was subsequently processed to cap the stems, The stem-surfaced film was then coated with a layer of Bynel™ 3101 having a thickness of 25 microns using a 44 mm (1.35 in) Prodex Model 13524 single screw extruder having an L/D of 14:1 and a temperature profile rising to approximately 227° C. and a single layer die having a width of about 305 mm (12 in). The web was moving at a speed of 9.1 m/min (20 ft/min). The extrusion coating occurred at a heated nip where a chrome roll was heated to 121° C. and a rubber backup roll that touched the stem surface was heated to 10° C. to maximize the interfacial bond without distorting the capped stem structures.

Example 16 and Comparative Example 3 were subsequently corona treated and coated with SSKP-4000 Black Flexographic Ink (available from Werneke Inks, Plymouth, Minn.) using a Pamarco Hand Proofer (available from Pamarco Inc., Roselle, N.J.). The ink was allowed to dry at ambient conditions for ten minutes. A good print quality was obtained for each sample and a Tape Snap Test was performed on each. For Example 16, good ink adhesion was demonstrated and no delamination of Component B from Component A was observed. For Comparative Example 3, good ink adhesion was demonstrated but some delamination was observed between Component B and Component A.

EXAMPLE 17

A stem surface material similar to Example 16 was coextruded in a different manner. A single layer Cloeren die approximately 70 cm wide was fed with material from a Cloeren 3 layer feedblock that was set up for only two layers. Component A was blended to 96% Union Carbide SRD 7-587 and 4% Reed Spectrum Pigment Concentrate (11000409224), which was passed at 15.9 rpm through a 64 mm Davis Standard single screw extruder having a L/D ratio of 24:1 and a temperature profile rising from 215° C. to 260° C. Component B-was a blend of 96% Bynel 3101 and 4% Reed Spectrum Pigment Concentrate, which was passed at 27 rpm through a 38 mm Davis Standard single screw extruder having an L/D ratio of 24:1, and a temperature profile rising from approximately 150° C. to 205° C. The relative feed rates were adjusted such that the film thickness of Component A is approximately 130 to 150 microns, plus the height of the pins, and Component B is approximately 25 to 50 microns thick. The stem surface film traveled at a speed of 16.8 m/min. The roll with various tooled surfaces was heated to approximately 52° C. and the chrome plated rolls were heated to approximately 15° C. The average nip pressures were both 23 psi. A finished web width of 50 cm was obtained after edge trimming. Product was made at pin densities of 50 pins/cm$^2$ and 140 pins/cm$^2$.

The stem web was then passed at 12 m/min through two heated nips where the hot roll facing the stem surface was heated to approximately 140° C. and a cold chrome roll facing the B layer was chilled to approximately 7° C. Mushroom-shaped caps were formed on the stems while the component B layer was left undisturbed. The B layer was air corona treated to improve the ink receptivity of the B layer.

A first sample with a pin density of 140 pins/cm$^2$ was printed by the Scotchprint™ Electrostatic process. Printed transfer paper 8603 was heat laminated to the smooth B layer using an Orca III laminator with a top roll temperature of 92° C. and a bottom roll temperature of 56° C., with 50 psi pressure and a laminating speed of 0.76 m/min. Complete transfer of the image was obtained. Visual examination showed that a defect-free transfer was obtained with good color density.

A second sample having pin densities of 50 pins/cm² and 140 pins/cm² were printed with Scotchcal 9705 black screen printing ink using a 390T screen and cured with a medium pressure mercury vapor focused UV lamps at 168 mJ/cm² (American Ultraviolet Co., Murrary Hill, N.J.). The printed samples were tested for ink adhesion using the Tape Snap Test. Excellent ink adhesion was obtained for both lots.

These samples were screen-printed with SCOTCHCAL 3972 solvent-based screen printing ink using a 225 mesh screen and dried at 66° C. for 30 minutes. Excellent print quality was obtained and both samples passed the Tape Snap Test with excellent results. In both cases, no delamination was observed between the Bynel 3101 and the SRD 7-587 layers during the Tape Snap Test.

EXAMPLE 18

Lot 9701-3 as prepared in Example 17 had an Ink Jet Receptor coating (3M 8502URC) heat laminated to the smooth side of the 9701-3 material on a 3M 9540 laminator at 82° C., 0.3 meters/min and at 64 psi. The subsequent construction was then fed through a Novajet III inkjet printer (Encad Inc. 6059 Cornerstone Ct. W., San Diego, Calif.), with American Inkjet Inks (American Inkjet, 13 Alexander Rd, Billeria, Mass.). Testing with the Tape Snap Test indicated good ink anchorage with no ink being removed from the surface of the web.

COMPARATIVE EXAMPLE 4

A stem surface the same as Comparative Example 3 was corona treated in the same manner. An ink jet receptor coating was laminated to the smooth surface and the coating was printed in the same manner as Example 18. Testing with the Tape Snap Test resulted in complete removal of the ink and the inkjet receptor coating from the surface of the web.

EXAMPLE 19

The stem-surfaced films of Example 19 was composed of two different polymers, Component A and Component B, arranged in a two layer configuration depicted in FIG. 8 where each side of the film had a stem array protruding from the surface.

The stem-surfaced film of Example 19 demonstrated the efficacy of the present invention to make an industrial roll covering material having projections on both major surfaces, each being of a different composition. Such articles provide an improved friction surface with an integral attachment system. A molten bicomponent polymeric film having two major surfaces was prepared by extruding material through a split-manifold bicomponent film die fed by two single-screw extruders, both operating at 204° C. The first major surface of the bicomponent film was of Component A, Shell polypropylene SRD 7-560, now available from Union Carbide Corporation, Danbury, Conn. The second major surface was of Component B, Rexflex™ FP-D1720 flexiblized polypropylene, commercially available from Rexene Corporation, Dallas, Tex. The extruded bicomponent film was introduced into the nip between the top and middle roll of a vertical stack of three temperature-controlled co-rotating 5-in diameter (12.70 cm) cylindrical rolls aluminum sleeves. The middle and top rolls have aluminum sleeves with cylindrical cavities (0.66 mm (0.026 in) deep by 0.46 mm (0.018 in) in diameter, and 1.32 mm (0.052 in) deep by 0.46 mm (0.018 in) in diameter, respectively) disposed in rows parallel to the rotational axis about the circumference of each roll, the cavities and rows both being spaced 1.41 mm (0.0556 in) apart. Alternate rows of cavities were offset 0.71 mm (0.0278 in) to produce a staggered array. The continuous, molten bicomponent film was deposited into the nip between the top and middle rolls, the roll was rotated approximately 180° to the nip between the middle and bottom rolls where the now partially-cooled bicomponent film was contacted by and transferred to the surface of the third roll, which is a chrome plated steel roll, and the third roll rotated another 180° where the molded bicomponent article was removed from the second roll surface by a tension-controlled winder. The stems formed on the first major surface were readily deformable into a mushroom-shaped cap upon contact with a hot surface to provide a mechanical fastening surface suitable for mating with a surface having a fibrous loop surface or to itself The projections thus formed on the second major surface were tough and flexible, providing controlled friction when engaging a traversing web or sheet when employed as the contact surface of an industrial roll.

EXAMPLE 20

The stem-surfaced film of Example 20 was composed of two different polymers, Component A and Component B, arranged in a three layer ABA configuration having stems depicted in FIG. 1 where the middle layer composed of Component B is elastic and is able to relieve stress that may otherwise occur in subsequent processing operations. This film was made using extrusion..

Component A, SRD 7-560, was fed into a single screw extruder having a, diameter of 64 mm, an L/D ratio of 24:1, a speed of 122 rpm and a rising temperature profile of from 185° C. to 232° C. Component B, Exact™ ULDPE, a linear low density polyethylene available from Exxon, was fed into a single screw extruder having a diameter of 3 8 mm, an L/D ratio of 24:1, a speed of 41 rpm and a rising temperature profile of from 185° C. to 232° C. Component A was then passed into the top and bottom of an 46 mm (18 in) wide three layer die and Component B was passed into the middle to form a molten three-layer film. The molten three-layer film was fed into a nip formed by two rolls having a tooled surface side and a smooth surface side and pressed with a force of up to 0.41 MPa (60 psi). The tooled surface contained cavities with a diameter of about 430 microns (17 mils), depths in excess of about 1.52 mm (60 mils) and spacing such as to result in a stem array having a stem density of about 50 stems/cm² (324 stems/in²). The two surfaces had a temperature maintained at about 90° C. The resulting cast film was removed from the tooled surface at a rate of about 16.5 m/min (55 fpm) to form a stem-surfaced film that resembled FIG. 4. The film had a base thickness of about 127 microns (5 mils) with rod-like stem projections extending from the surface on the film having a diameter of approximately 430 microns and a stem height of about 760 microns (30 mils). The 127 micron base film consisted of three layers, two outer layers of Component A having a thickness of about 51 microns (2 mils) and a middle layer of Component B having a thickness of about 25 microns (1 mil). The stem-surface film was then run at 7.6 m/min (25 fpm) with the stem-surface on top through a three-roll, two-nip heated stack to form caps on the end of the stems having diameters of 760 microns (30 mils) and heights of about 510 microns (20 mils). The two outside rolls were heated to about 149° C., the middle roll to about 16° C. and the gaps of both nips were between 380–635 microns (15–25 mils).

The three-layer stem-surface film with capped stems was used as the backing in a coated abrasive article, which was produced in a manner similar to the teachings of U.S. Pat.

No. 5,551,961. The abrasive mineral used was a grade 180 heat treated aluminum oxide, and both the make and size coats were a blend of phenolic and ureaformaldehyde binders.

As a result of the middle layer of stretchy low molecular weight thermoplastic, much of the stress inherently induced into a homopolymer abrasive film having a mechanical fastening surface by the make coating and curing process was reduced and the resulting abrasive film had better properties, such as curl.

What is claimed is:

1. A web of material having two sides and a plurality of stems extending from at least one side of the web, the web comprising:

a first layer of material having a first side and a second side; and a second layer of material having a first side and a second side, wherein the first side faces and is joined to the first side of the first layer;

wherein the stems are formed from both the first layer of material and the second layer of material such that the material forming the second layer extends from the second side of the second layer, and the material forming the first layer protrudes into the material forming the second layer to form at least a part of the stems.

2. The web of claim 1 wherein the first and second layers of material are each formed of at least one layer having at least one melt processable polymeric material.

3. The web of claim 1 wherein the first layer of material differs from the second layer of material and wherein the first and second layers of material are joined together while they are both molten before either layer has cooled.

4. The web of claim 1 wherein one of the layers is discontinuous and comprises a plurality of portions of the respective material unconnected with other portions of the same respective material, wherein the portions have shapes selected from the group of rods, prisms, spheres, parallelepipeds, irregular angular shapes, and irregular curved shapes.

5. The web of claim 1 wherein both sides of the web have stems.

6. The web of claim 1 wherein one or more of the stems have caps.

7. The web of claim 1 wherein at least one side of the web is receptive to a colorant for the formation of a durable graphic image or durable printed matter.

8. The web of claim 7 wherein the first layer is one of a receptive layer for image transfer, screen printing, lithographic printing and inkjet printing; and a receptive primer for pressure sensitive adhesives and coatings.

9. The web of claim 1 wherein the stems are uncapped and have an outer surface that is self-adhering.

10. The web of claim 1 wherein the first and second layers of material are formed simultaneously and the web further comprises additional layers of material formed simultaneously and joined together with the first and second layers while they are all molten, before any layer has cooled.

11. A method of making a web of material having a plurality of stems extending from at least one side of the web, wherein the method comprises the steps of:

selecting at least a first material for a first layer of material;

selecting at least a second material for a second layer of material;

melt forming, from the first material, the first layer having a first surface and a second surface;

melt forming, from the second material, the second layer having a first surface and a second surface;

joining the first surfaces of first and second layers of material while the layers are in the molten state to form a multiple layer sheet;

forming a plurality of stems from at least one of the first material and the second material on at least the second surface of the second layer of material; and selecting relative quantities of the first and second materials such that the first material which forms the first laver protrudes into or through the second layer and forms at least part of the stems formed on the second surface of the second layer.

12. The method of claim 11 wherein the melt forming step comprises melt forming each of the first and second layers from at least one melt processable polymeric material.

13. The method of claim 11 wherein the stem forming step comprises pressing the multiple layer sheet against at least one temperature controlled surface containing an array of holes to form an array of stems.

14. The method of claim 13 further comprising the step of pressing the stems against a heated surface to form caps on the tips of the stems.

15. The method of claim 11 wherein the stem forming step, comprises:

passing the multiple layer sheet through a shaped die to form a plurality of raised ribs on at least one surface of the multiple layer sheet;

passing a plurality of sharp edges perpendicularly through the ribs; and stretching the multiple layer sheet to separate each rib into a plurality of stems.

16. The method of claim 11 further comprising melt forming additional layers of material; and joining the additional layers of material to the first and second layers of material while the layers are in the molten state to form a multiple layer sheet.

17. The method of claim 11 wherein the melt forming step comprises simultaneously melt forming the first and second layers of material and the joining step comprises joining together the first and second layers before any layer has cooled.

18. The method of claim 11 wherein the melt forming step comprises coextruding the first and second layers of material.

* * * * *